(12) United States Patent
Dai et al.

(10) Patent No.: US 9,316,894 B2
(45) Date of Patent: Apr. 19, 2016

(54) PROJECTING APPARATUS

(71) Applicants: Jia-Hong Dai, Hsin-Chu (TW);
Wen-Yen Chung, Hsin-Chu (TW);
Tsung-Ching Lin, Hsin-Chu (TW)

(72) Inventors: Jia-Hong Dai, Hsin-Chu (TW);
Wen-Yen Chung, Hsin-Chu (TW);
Tsung-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 226 days.

(21) Appl. No.: 14/037,392

(22) Filed: Sep. 26, 2013

(65) Prior Publication Data
US 2014/0092368 A1    Apr. 3, 2014

(30) Foreign Application Priority Data

Sep. 28, 2012   (CN) .......................... 2012 1 0370070

(51) Int. Cl.
*G03B 21/16*    (2006.01)
*H04N 9/31*    (2006.01)
(52) U.S. Cl.
CPC .............. *G03B 21/16* (2013.01); *H04N 9/3144* (2013.01)
(58) Field of Classification Search
CPC .... G03B 21/16; G03B 21/145; H04N 9/3144; H04N 9/3141
USPC ........................................... 353/57, 58, 60, 61
See application file for complete search history.

(56) References Cited

U.S. PATENT DOCUMENTS 6,739,831 B2 * 5/2004 Hsu et al. ..................... 415/60
2011/0157560 A1 6/2011 Hsiao

FOREIGN PATENT DOCUMENTS

CN          102289139          12/2011

OTHER PUBLICATIONS

Chen, Bing; CN 102289139 A; Dec. 21, 2011; Machine Translation in English.*

* cited by examiner

*Primary Examiner* — William C Dowling
*Assistant Examiner* — Ryan Howard
(74) *Attorney, Agent, or Firm* — Jianq Chyun IP Office

(57) ABSTRACT

A projecting apparatus includes a chassis, an optical engine, a first fan set and a second fan set. The first fan set is disposed in the chassis and located at a first air outlet, and is configured to drive air to flow via a first air inlet into the chassis to form a first air flow. The first air flow flows out of the chassis via the first air outlet. The second fan set is disposed in the chassis and located at a second air outlet, and is configured to drive air to flow via the first air inlet into the chassis to form a second air flow. The second air flow flows out of the chassis via the second air outlet. A flow direction of the first air flow at the first air outlet is perpendicular to that of the second air flow at the second air outlet.

14 Claims, 3 Drawing Sheets

PROJECTING APPARATUS

CROSS-REFERENCE TO RELATED APPLICATION

This application claims the priority benefit of China application serial no. 201210370070.7, filed on Sep. 28, 2012. The entirety of the above-mentioned patent application is hereby incorporated by reference herein and made a part of this specification.

BACKGROUND OF THE INVENTION

1. Field of the Invention

The invention is directed to a projecting apparatus, and more particularly, to a projecting apparatus having favorable heat dissipation efficiency.

2. Description of Related Art

A projecting apparatus is a display apparatus configured to create a large-sized screen. An imaging principle of the projecting apparatus is to convert an illumination beam generated by a light source into an image beam by using a light valve, and then to project the image beam onto a screen or a wall surface via a projection lens so as to form an image.

FIG. 1 shows a configuration of devices in a conventional projecting apparatus. Referring to FIG. 1, a projecting apparatus 100 includes a chassis 120, a plurality of light source heat sinks 140a, 140b, 140c, a first fan set 160, a second fan set 180 and a power supply 190. The chassis 120 has two air inlets 120a, 120b, and a plurality of air outlets 120c, 120d, 120e. The first fan set 160 is disposed at a first air inlet 120a, and the second fan set 180 is disposed at a second air inlet 120b.

When the first fan set 160 and the second fan set 180 respectively drive air to enter the chassis 120 via the first air inlet 120a and the second air inlet 120b, the air forms air flows having the rotational property after passing through the fan sets 160 and 180. Next, the two air flows having the rotational property pass through the projecting apparatus 100, converge in front of the air outlets 120c and 120d to cause a turbulence, thereby forming a flow resistance. Consequently, the two air flows are hindered, the air flow rate decreases and noise increases. In addition, a flow direction of the air flow having the rotational property is hard to control. Hence an additional air guiding design is required in order to prevent a non-uniform distribution of air flow that leads to low heat dissipation efficiency of the projecting apparatus 100.

Furthermore, after the first fan set 160 sucks cold air from outside into the projecting apparatus 100, the light source heat sink 140a and the light source heat sink 140b are cooled in sequence. Next, the power supply 190 is cooled by hot air. Finally, the hot air is discharged via the air outlets 120c and 120d. Since the cold air is heated after cooling the light source heat sinks 140a and 140b, it provides a limited cooling effect to the power supply 190 downstream.

Following the above, in the configuration of devices in the conventional projecting apparatus 100, the positions of the fan sets 160, 180, the air inlets 120a, 120b and the air outlets 120c, 120d affect the flow directions of the air flows sucked into the projecting apparatus 100. In addition, the positions of each of the heat sinks 140a, 140b, 140c and the power supply 190 in the projecting apparatus 100 also affect the heat dissipation efficiency. Therefore, the influence of relative positions of each element in the projecting apparatus on the heat dissipation efficiency is a topic worthy of discussion.

U.S. patent publication no. 2011/0157560 discloses a projector including two air inlets disposed on the same side surface and two air outlets disposed on opposite side surfaces, wherein one air passage is formed between one air inlet and one air outlet, and another air passage is formed between another air inlet and another air outlet. The two air passages are straight passages parallel to each other, so that the air flows generated do not interfere with each other. U.S. Pat. No. 6,739,831 discloses a cooling device for projector, wherein a first air inlet, a second air inlet, and two air outlets disposed on different sides are provided on a casing of the projector. The air outlets located on different sides of the casing are perpendicular to each other, but the casing further has air ducts for circulation of two air flows. Chinese patent publication no. 102289139 discloses a laser projector, wherein heat sink fins of a light source module are disposed between a heat sink fan and an air outlet.

SUMMARY OF THE INVENTION

The invention proposes a projecting apparatus having favorable heat dissipation efficiency and reduced noise in operation.

Other objectives and advantages of the invention are further illustrated by the technical features disclosed in the invention.

To achieve one, a part of, or all of the above objectives, or other objectives, an embodiment of the invention provides a projecting apparatus including a chassis, an optical engine, a first fan set and a second fan set. The chassis includes at least four side walls, a first air outlet, a second air outlet and a first air inlet. Among the side walls of the chassis, a first side wall is opposite to a third side wall and a second side wall is opposite to a fourth side wall. A first corner is formed by the first side wall and the second side wall. A second corner is formed by the second side wall and the third side wall. A third corner is formed by the third side wall and the fourth side wall. A fourth corner is formed by the fourth side wall and the first side wall. The first air outlet is located on the first side wall and close to the fourth corner. The second air outlet is located on the second side wall and close to the second corner. The first air inlet is located at the third corner. The optical engine is disposed within the chassis and close to the first corner.

The first fan set is disposed in the chassis and located at the first air outlet, wherein the first fan set is configured to drive air to flow via the first air inlet into the chassis to form a first air flow, and the first air flow flows out of the chassis via the first air outlet. The second fan set is disposed within the chassis and located at the second air outlet, wherein the second fan set is configured to drive air to flow via the first air inlet into the chassis to form a second air flow, and the second air flow flows out of the chassis via the second air outlet. A flow direction of the first air flow at the first air outlet is perpendicular to a flow direction of the second air flow at the second air outlet.

In an embodiment of the invention, the optical engine further includes a light source module and an imaging module, and a distance between the imaging module and the first corner is shorter than a distance between the light source module and the first corner.

In an embodiment of the invention, the projecting apparatus further includes a power supply disposed within the chassis and close to the third side wall, wherein the second fan set is located between the second air outlet and the power supply.

In an embodiment of the invention, the first air inlet is disposed on the third side wall. The projecting apparatus further includes a first heat sink thermally coupled to the light source module, wherein the first heat sink is disposed between the first air outlet and the first fan set. The projecting apparatus further includes a second heat sink thermally coupled to the light source module, wherein the second heat sink is disposed at the first air inlet. The projecting apparatus further includes a third heat sink thermally coupled to the light source module, wherein the first fan set is disposed between the first heat sink and the third heat sink.

In an embodiment of the invention, the light source module includes a first solid state light emitting device thermally coupled to the first heat sink via a first heat pipe, a second solid state light emitting device thermally coupled to the second heat sink via a second heat pipe, and a third solid state light emitting device thermally coupled to the third heat sink via a third heat pipe.

In an embodiment of the invention, the first air inlet is disposed on the fourth side wall. The projecting apparatus further includes a first heat sink thermally coupled to the light source module, wherein the first heat sink is disposed between the first air outlet and the first fan set. The projecting apparatus further includes a second heat sink thermally coupled to the light source module, wherein the second heat sink is disposed at the first air inlet. The projecting apparatus further includes a third heat sink thermally coupled to the light source module, wherein the power supply is disposed between the third heat sink and the second fan set.

In an embodiment of the invention, the first air inlet is disposed on the fourth side wall. The chassis includes a second air inlet disposed on the third side wall. The projecting apparatus further includes a first heat sink thermally coupled to the light source module, wherein the first heat sink is disposed between the first air outlet and the first fan set. The projecting apparatus further includes a second heat sink thermally coupled to the light source module, wherein the second heat sink is disposed at the first air inlet. The projecting apparatus further includes a third heat sink thermally coupled to the light source module, wherein the power supply is disposed between the third heat sink and the third side wall.

In an embodiment of the invention, the imaging module includes a light valve disposed within the chassis and configured to convert a light beam emitted from the light source module into an image beam. The light valve is thermally coupled to a fourth heat sink. The imaging module also includes a projection lens disposed within the chassis and configured to convert the image beam into a projection beam. The fourth heat sink is disposed close to the second fan set. The second air flow flows through the fourth heat sink and the second fan set in sequence before flowing out of the chassis via the second air outlet.

Based on the above, in the above embodiments of the invention, the first fan set and the second fan set of the projecting apparatus are disposed respectively at the first air outlet and the second air outlet, so that the first air flow and the second air flow of the projecting apparatus do not have a rotational property. An arrangement of relative positions of the first air inlet, the first air outlet and the second air outlet causes the first air flow and the second air flow flowing out of the first air outlet and the second air outlet to have flow directions perpendicular to each other, so as to avoid a chaos due to convergence of air flows. Furthermore, with an arrangement of positions of relevant elements in the projecting apparatus, the projecting apparatus has favorable heat dissipation efficiency and reduced noise in operation.

In order to make the aforementioned features and advantages of the invention more comprehensible, several embodiments accompanied with figures are described in detail below.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
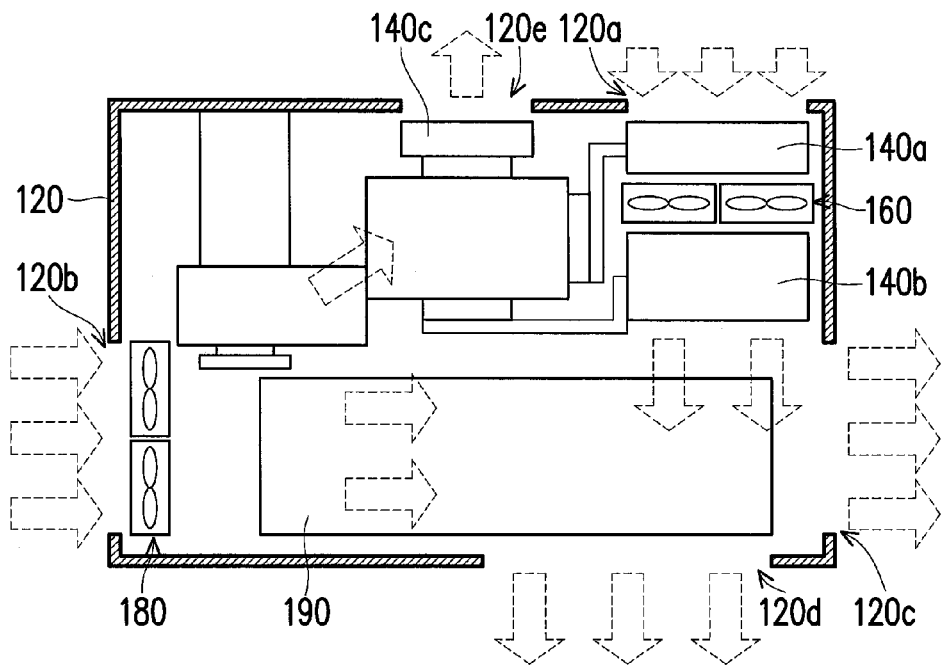
FIG. 1 shows a configuration of devices in a conventional projecting apparatus.
Figure 2:
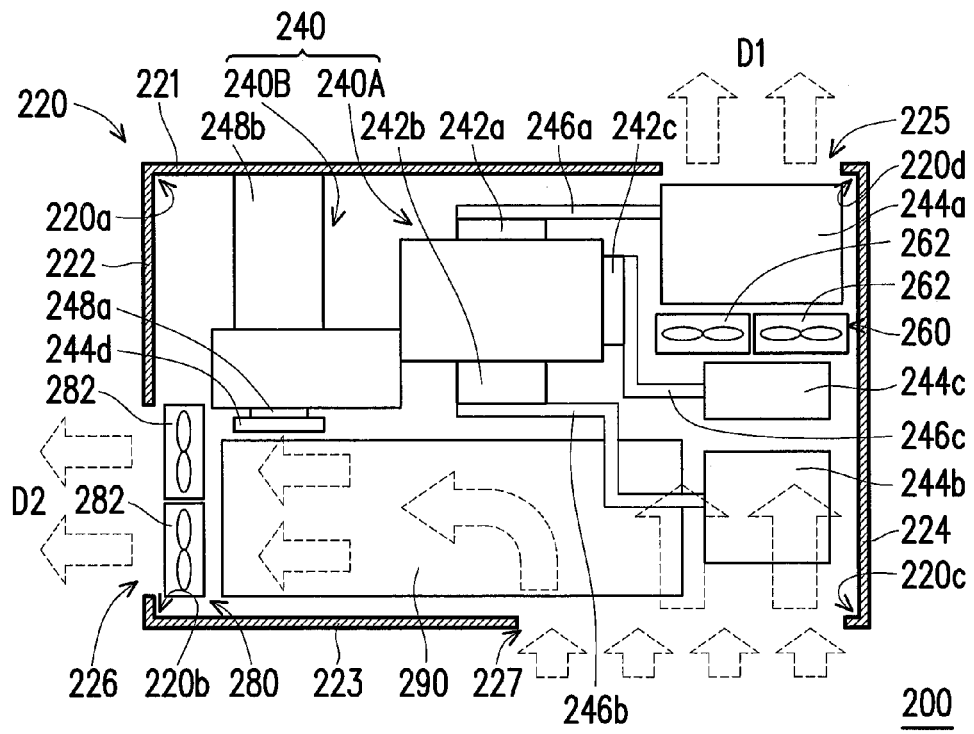
FIG. 2 shows a configuration of devices in a projecting apparatus according to an embodiment of the invention.

FIG. 2 shows a configuration of devices in a projecting apparatus according to an embodiment of the invention. Referring to FIG. 2, a projecting apparatus 200 of the embodiment includes a chassis 220, an optical engine 240, a first fan set 260 and a second fan set 280.

In the embodiment, the chassis 220 includes, for example, four side walls, wherein a first side wall 221 is opposite to a third side wall 223, and a second side wall 222 is opposite to a fourth side wall 224. A first corner 220a is formed by the first side wall 221 and the second side wall 222. A second corner 220b is formed by the second side wall 222 and the third side wall 223. A third corner 220c is formed by the third side wall 223 and the fourth side wall 224. A fourth corner 220d is formed by the fourth side wall 224 and the first side wall 221.

In the embodiment, the chassis 220 includes a first air outlet 225 located on the first side wall 221 and close to the fourth corner 220d. The chassis 220 includes a second air outlet 226 located on the second side wall 222 and close to the second corner 220b. The chassis 220 includes a first air inlet 227 located on the third side wall 223 and close to the third corner 220c. The optical engine 240 is disposed in the chassis 220 and close to the first corner 220a. With respect to the relative positions of the devices in the projecting apparatus 200 as illustrated in FIG. 2, the first air outlet 225 is located in an upper right direction from the optical engine 240, the second air outlet 226 is located in a lower left direction from the optical engine 240, and the first air inlet 227 is located in a lower right direction from the optical engine 240.

The first fan set 260 is disposed within the chassis 220 and located at the first air outlet 225, and the second fan set 280 is disposed within the chassis 220 and located at the second air outlet 226. In the embodiment, the first fan set 260 includes two abreast fans 262, and the second fan set 280 includes two abreast fans 282 for exemplary purposes, but the invention is not limited thereto. The first fan set 260 is configured to drive air outside the chassis 220 to flow via the first air inlet 227 into the chassis 220 to form a first air flow, and the first air flow flows out of the chassis 220 via the first air outlet 225. The second fan set 280 is configured to drive the air outside the chassis 220 to flow via the first air inlet 227 into the chassis 220 to form a second air flow, and the second air flow flows out of the chassis 220 via the second air outlet 226. Arrows in FIG. 2 indicate flow directions D1 and D2 of, respectively, the first air flow and the second air flow. As shown in FIG. 2, the flow direction D1 of the first air flow at the first air outlet 225 is perpendicular to the flow direction D2 of the second air flow at the second air outlet 226.

In the embodiment, the first air flow and the second air flow are driven by respectively the first fan set 260 and the second fan set 280, and are sucked into the chassis 220, wherein the first air flow flows through the chassis 220 and cools the relevant elements, and then passes through the first fan set 260 and flows out of the chassis 220 via the first air outlet 225. Similarly, the second air flow flows through the chassis 220 and cools the relevant elements, and then passes through the second fan set 280 and flows out of the chassis 220 via the second air outlet 226. Since the first air flow and the second air flow do not pass through the fan sets 260 and 280 first when flowing into the chassis 220, the first air flow and the second air flow do not have a rotational property while flowing through the chassis 220. Accordingly, the flow directions D1 and D2 of the air flows are easier to control. In the embodiment, the flow directions D1 and D2 of the first air flow and the second air flow are designed to be perpendicular to and separate from each other at the corresponding air outlets 225 and 226, thereby improving the problem that additional flow resistance is caused due to convergence of hot airs at the air outlet in the prior art projecting apparatus, increasing the air flow rate in the internal system of the projecting apparatus and reducing the noise in the system caused by the air flows.

As illustrated in FIG. 2, the projecting apparatus 200 further includes a power supply 290 providing a power source required for driving the projecting apparatus 200. In the embodiment, the power supply 290 is disposed in the chassis 220 and close to the third side wall 223, wherein the second fan set 280 is located between the second air outlet 226 and the power supply 290. In addition, as illustrated in FIG. 2, the optical engine 240 includes a light source module 240A and an imaging module 240B. The imaging module 240B is disposed closer to the first corner 220a relative to the light source module 240A, i.e., a distance between the imaging module 240B and the first corner 220a is shorter than a distance between the light source module 240A and the first corner 220a. The light source module 240A is disposed between the first fan set 260 and the imaging module 240B.

Following the above, the light source module 240A includes a first solid state light emitting device 242a, a second solid state light emitting device 242b and a third solid state light emitting device 242c. The solid state light emitting devices are, for example, light emitting diodes (LEDs), laser diodes or a combination thereof. For example, the first solid state light emitting device 242a is a green LED, the second solid state light emitting device 242b is a red LED, and the third solid state light emitting device 242c is a blue LED. As illustrated in FIG. 2, the projecting apparatus 200 further includes a first heat sink 244a, a second heat sink 244b and a third heat sink 244c. The first solid state light emitting device 242a is thermally coupled to the first heat sink 244a, wherein the first heat sink 244a is disposed between the first air outlet 225 and the first fan set 260. The second solid state light emitting device 242b is thermally coupled to the second heat sink 244b, wherein the second heat sink 244b is disposed at the first air inlet 227. The third solid state light emitting device 242c is thermally coupled to the third heat sink 244c, wherein the first fan set 260 is disposed between the first heat sink 244a and the third heat sink 244c.

In detail, the first solid state light emitting device 242a is thermally coupled to the first heat sink 244a via a first heat pipe 246a, the second solid state light emitting device 242b is thermally coupled to the second heat sink 244b via a second heat pipe 246b, and the third solid state light emitting device 242c is thermally coupled to the third heat sink 244c via a third heat pipe 246c. In the embodiment, each of the heat sinks 244a, 244b and 244c include a plurality of heat sink fins that are aligned in parallel, and each of the heat pipes is thermally coupled to the heat sink fins. Thus the heat generated by the three solid state light emitting devices 242a, 242b and 242c in operation is transferred to each of the heat sinks via corresponding heat pipes.

It is worth noting that the second solid state light emitting device 242b is a red LED and has the lowest temperature tolerance. Thus a distance between the heat sink 244b thermally coupled to the second solid state light emitting device 242b and the first air inlet 227 is shorter than a distance between the other heat sinks 244a, 244c and the first air inlet 227, so as to obtain a better heat dissipation effect.

Figure 3:
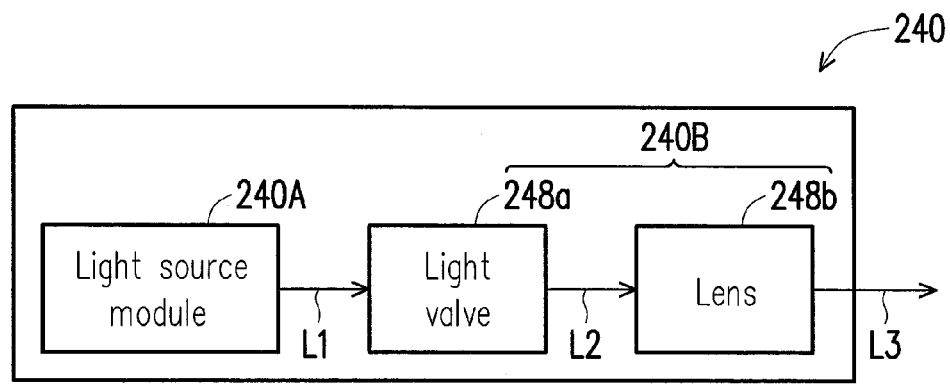
FIG. 3 is a block diagram of the optical engine in FIG. 2.

FIG. 3 is a block diagram of the optical engine in FIG. 2. Referring to both FIG. 2 and FIG. 3, in detail, the imaging module 240B includes a light valve 248a and a projection lens 248b. The light valve 248a is disposed in the chassis 220 and is adapted to convert a light beam L1 emitted from the light source module 240A into an image beam L2. In the embodiment, the light valve 248a is a digital micro-mirror device (DMD). The projection lens 248b is disposed in the chassis 220 and configured to convert the image beam L2 into a projection beam L3. The projecting apparatus 200 includes a fourth heat sink 244d. The fourth heat sink 244d is thermally coupled to the light valve 248a, disposed close to the second fan set 280 and located between the power supply 290 and the light valve 248a.

In the embodiment, the heat generated by the optical engine 240 in operation is transferred to each of the heat sinks 244a, 244b, 244c and 244d. The first air inlet 227 is disposed on the third side wall 223 of the chassis 220. When the first fan set 260 drives cold air outside the chassis 220 to enter the chassis 220 via the first air inlet 227 to generate the first air flow, the first air flow first cools the second heat sink 244b, then cools the third heat sink 244c, and finally cools the first heat sink 244a when flowing toward the first air outlet 225. Accordingly, the second heat sink 244b, the third heat sink 244c and the first heat sink 244a are cooled in sequence and the heat generated by each of the solid state light emitting devices 242a, 242b and 242c in operation is discharged. When the second fan set 280 drives the cold air outside the chassis 220 to enter the chassis 220 via the first air inlet 227 to generate the second air flow, the second air flow flows from the first air inlet 227 toward the second air outlet 226, and further cools the power supply 290 and the fourth heat sink 244d. Accordingly, the first air flow and the second air flow cool the relevant electronic or optical elements that generate heat energy when the projecting apparatus 200 is in operation, thereby performing an effective heat dissipation to all of the devices in the projecting apparatus 200.

In the embodiments of the invention, by the flow directions D1 and D2 of the first air flow and the second air flow of the projecting apparatus 200 being perpendicular to and separate from each other at the corresponding air outlets 225 and 226, the problems regarding the convergence of hot airs at the air outlet and the noise in the prior art projecting apparatus are improved. In addition, the first air flow and the second air flow do not have the rotational property when flowing through the chassis 220. Therefore, by arranging the positions of the first air inlet 227, the first air outlet 225, the second air outlet 226 and the first fan set 260, the second fan set 280, as well as the relevant positions of each element and the heat sinks 244a, 244b, 244c, 244d in the projecting apparatus 200, the first air flow and the second air flow respectively flow through positions predetermined by the designer. Based on the above, the projecting apparatus 200 of the embodiment does not cause unnecessary noise and has favorable heat dissipation efficiency.

Figure 4:
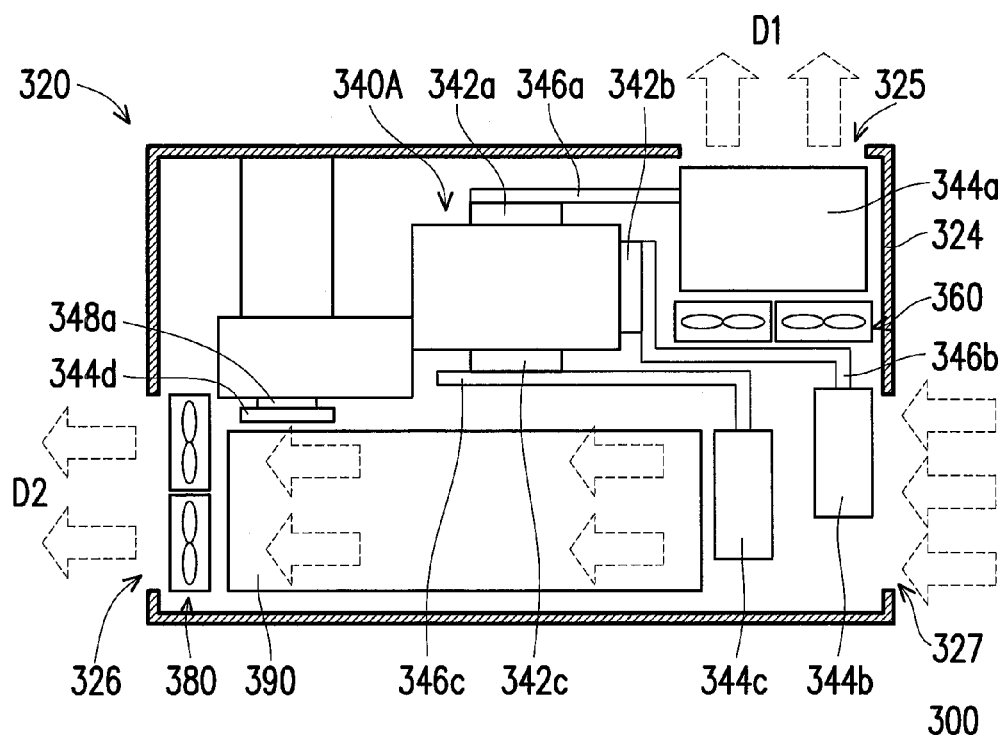
FIG. 4 shows a configuration of devices in a projecting apparatus according to another embodiment of the invention.

FIG. 4 shows a configuration of devices in a projecting apparatus according to another embodiment of the invention. The embodiment in FIG. 4 is similar to the embodiment in FIG. 2, and the two embodiments are different mainly in positions of a first air inlet 327 and heat sinks 344a, 344b and 344c. Only the difference between the embodiment and the above embodiments will be explained here; as for the other parts, please refer to the descriptions of the above embodiments.

Referring to FIG. 4, in the embodiment, the first air inlet 327 of a projecting apparatus 300 is disposed on a fourth side wall 324 of a chassis 320. The projecting apparatus 300 further includes a first heat sink 344a, a second heat sink 344b and a third heat sink 344c. In a light source module 340A, a first solid state light emitting device 342a is thermally coupled to the first heat sink 344a, and the first heat sink 344a is disposed between a first air outlet 325 and a first fan set 360. A second solid state light emitting device 342b is thermally coupled to the second heat sink 344b, and the second heat sink 344b is disposed at the first air inlet 327. A third solid state light emitting device 342c is thermally coupled to the third heat sink 344c, and a power supply 390 is disposed between the third heat sink 344c and a second fan set 380.

In detail, the first solid state light emitting device 342a is thermally coupled to the first heat sink 344a via a first heat pipe 346a, the second solid state light emitting device 342b is thermally coupled to the second heat sink 344b via a second heat pipe 346b, and the third solid state light emitting device 342c is thermally coupled to the third heat sink 344c via a third heat pipe 346c. In the embodiment, each of the heat sinks 344a, 344b and 344c includes a plurality of heat sink fins that are aligned in parallel, and each of the heat pipes 346a, 346b and 346c is thermally coupled to the heat sink fins. Thus the heat generated by each of the solid state light emitting devices 342a, 342b and 342c in operation is transferred to the corresponding heat sinks 344a, 344b and 344c via corresponding heat pipes.

When the first fan set 360 drives the cold air to enter the chassis 320 via the first air inlet 327 to generate the first air flow, the first air flow is guided to flow toward the first air outlet 325, and passes through the second heat sink 344b, the third heat sink 344c and the first heat sink 344a, in sequence, and then flows outside via the first air outlet 325. Accordingly, the heat energy generated by each of the solid state light emitting device 342a, 342b and 342c is dissipated by the first air flow. When the second fan set 380 drives the cold air to enter the chassis 320 via the first air inlet 327 to generate the second air flow, the second air flow passes through the third heat sink 344c, the power supply 390 and a fourth heat sink 344d thermally coupled to a light valve 348a, and then flows outside via a second air outlet 326.

Compared to the embodiment in FIG. 2, the projecting apparatus 300 of the embodiment changes the positions of the second heat sink 344b and the third heat sink 344c in accordance with the change of position of the first air inlet 327. Similar to the above embodiments, in the embodiment, the flow direction D1 of the first air flow at the first air outlet 325 is perpendicular to the flow direction D2 of the second air flow at the second air outlet 326. In addition, in the present embodiment, similarly, by arranging the positions of the first air inlet 327, the first air outlet 325, the second air outlet 326 and the first fan set 360, the second fan set 380, as well as the relevant positions of each element in the projecting apparatus 300, the first air flow and the second air flow respectively flow through positions predetermined by the designer, thereby achieving a purpose of enhancing heat dissipation efficiency.

Figure 5:
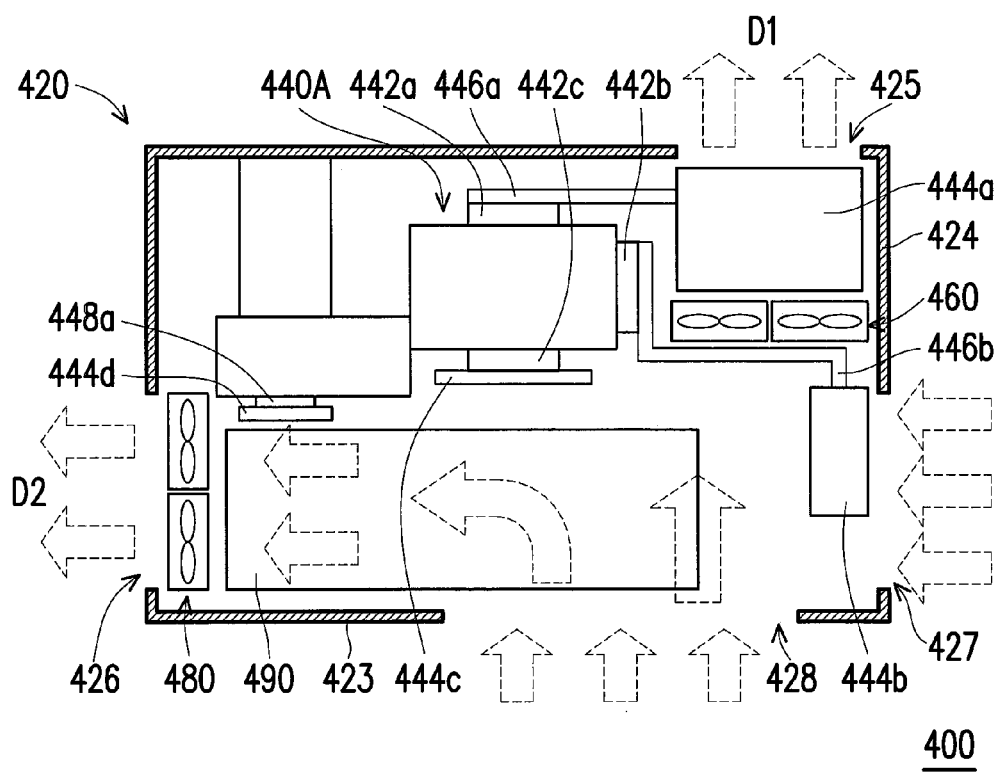
FIG. 5 shows a configuration of devices in a projecting apparatus according to still another embodiment of the invention.

FIG. 5 shows a configuration of devices in a projecting apparatus according to still another embodiment of the invention. The embodiment in FIG. 5 is similar to the above embodiments, and a main difference lies in positions of a first air inlet 427 and heat sinks 444a, 444b and 444c. In addition, a chassis 420 includes a second air inlet 428. Only the difference between the present embodiment and the above embodiments will be explained here; as for the other parts, please refer to the descriptions of the above embodiments.

Referring to FIG. 5, in the embodiment, the first air inlet 427 of a projecting apparatus 400 is disposed on a fourth side wall 424, and the second air inlet 428 is disposed on a third side wall 423. In addition, the projecting apparatus 400 further includes a first heat sink 444a, a second heat sink 444b and a third heat sink 444c. In a light source module 440A, a first solid state light emitting device 442a is thermally coupled to the first heat sink 444a, and the first heat sink 444a is disposed between a first air outlet 425 and a first fan set 460. A second solid state light emitting device 442b is thermally coupled to the second heat sink 444b, and the second heat sink 444b is disposed at the first air inlet 427. A third solid state light emitting device 442c is thermally coupled to the third heat sink 444c, and a power supply 490 is disposed between the third heat sink 444c and the third side wall 423 and between the second heat sink 444b and a second fan set 480.

In the embodiment, two of the solid state light emitting devices 442a and 442b are connected to the corresponding heat sinks 444a and 444b respectively via heat pipes 446a and 446b. In detail, the first solid state light emitting device 442a is thermally coupled to the first heat sink 444a via a first heat pipe 446a, and the second solid state light emitting device 442b is thermally coupled to the second heat sink 444b via a second heat pipe 446b. In addition, the third heat sink 444c is directly thermally coupled to the third solid state light emitting device 442c.

Referring to FIG. 5, in the embodiment, the design of the two air inlets 427 and 428 allows the first fan set 460 and the second fan set 480 to suck in a larger amount of cold air, thereby achieving better heat dissipation efficiency. When the first fan set 460 drives the cold air to enter the chassis 420 via the first air inlet 427 and the second air inlet 428 to generate the first air flow, the first air flow is guided toward the first air outlet 425, passes through the second heat sink 444b and the first heat sink 444a, in sequence, and flows outside via the first air outlet 425. When the second fan set 480 drives the cold air to enter the chassis 420 via the first air inlet 427 and the second air inlet 428 to generate the second air flow, the second air flow passes through the third heat sink 444c, the power supply 490 and a fourth heat sink 444d thermally coupled to a light valve 448a, and flows outside via a second air outlet 426.

In the embodiment, by arranging the positions of the first air inlet 427, the second air inlet 428, the first air outlet 425, the second air outlet 426, the first fan set 460 and the second fan set 480, as well as the relevant positions of each element in the projecting apparatus 400, the first air flow and the second air flow respectively flow through positions predetermined by the designer, thereby achieving favorable heat dissipation efficiency. In addition, similar to the above embodiments, in the present embodiment, the flow direction D1 of the first air flow at the first air outlet 425 is perpendicular to the flow direction D2 of the second air flow at the second air outlet 426, thus increasing the air flow rate and reducing the noise.

In summary, in the above embodiments of the invention, the first fan set and the second fan set of the projecting apparatus are disposed respectively at the first air outlet and the second air outlet, so that the first air flow and the second air flow flowing into the projecting apparatus do not have the rotational property while flowing through the chassis. Accordingly, the flow directions of the air flows are effectively controlled by the designer. In addition, by arranging the relative positions of the first air inlet, the first air outlet and the second air outlet, when the first air flow and the second air flow flow outside via the first air outlet and the second air outlet, the flow directions of the air flows are perpendicular to each other so that the chaos and noise due to convergence of the air flows are prevented. Also, the light source module, the imaging module, the power supply or the other optical and electronic elements in the projecting apparatus thus achieve effective and overall heat dissipation. In addition, the position of the first air inlet is flexible, and the number of the air outlets is not limited to one. By arranging the positions of each heat sink and the power supply of the projecting apparatus, the projecting apparatus has favorable dissipation efficiency.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the advantages or features disclosed by the invention. Moreover, the abstract and the headings are merely used to aid in searches of patent files and are not intended to limit the scope of the claims of the invention.

What is claimed is:

1. A projecting apparatus comprising:
    a chassis comprising:
        at least four side walls, wherein a first side wall is opposite to a third side wall and a second side wall is opposite to a fourth side wall, a first corner is formed by the first side wall and the second side wall, a second corner is formed by the second side wall and the third side wall, a third corner is formed by the third side wall and the fourth side wall, and a fourth corner is formed by the fourth side wall and the first side wall;
        a first air outlet located on the first side wall and close to the fourth corner;
        a second air outlet located on the second side wall and close to the second corner; and
        a first air inlet close to the third corner;
    an optical engine disposed within the chassis and close to the first corner, wherein the optical engine further comprises a light source module and an imaging module, the imaging module further comprises a light valve and a projection lens, and the projection lens is disposed on the first side wall;
    a first fan set disposed in the chassis and close to the first air outlet, wherein the first fan set is configured to drive exterior air to flow into the chassis to form a first air flow via the first air inlet, and the first air flow flows out of the chassis via the first air outlet; and
    a second fan set disposed within the chassis and close to the second air outlet, wherein the second fan set is configured to drive exterior air to flow into the chassis to form a second air flow via the first air inlet, the second air flow flows out of the chassis via the second air outlet, and a flow direction of the first air flow at the first air outlet is perpendicular to a flow direction of the second air flow at the second air outlet.

2. The projecting apparatus as claimed in claim 1, wherein a distance between the imaging module and the first corner is shorter than a distance between the light source module and the first corner.

3. The projecting apparatus as claimed in claim 2, wherein the projecting apparatus further comprises:
    a power supply disposed within the chassis and close to the third side wall, wherein the second fan set is located between the second air outlet and the power supply.

4. The projecting apparatus as claimed in claim 3, wherein the first air inlet is disposed on the third side wall, and the projecting apparatus further comprises:
    a first heat sink thermally coupled to the light source module, wherein the first heat sink is disposed between the first air outlet and the first fan set;
    a second heat sink thermally coupled to the light source module, wherein the second heat sink is disposed at the first air inlet; and
    a third heat sink thermally coupled to the light source module, wherein the first fan set is disposed between the first heat sink and the third heat sink.

5. The projecting apparatus as claimed in claim 4, wherein the light source module further comprises:
    a first solid state light emitting device thermally coupled to the first heat sink;
    a second solid state light emitting device thermally coupled to the second heat sink; and
    a third solid state light emitting device thermally coupled to the third heat sink.

6. The projecting apparatus as claimed in claim 5, wherein the first solid state light emitting device is thermally coupled to the first heat sink via a first heat pipe, the second solid state light emitting device is thermally coupled to the second heat sink via a second heat pipe, and the third solid state light emitting device is thermally coupled to the third heat sink via a third heat pipe.

7. The projecting apparatus as claimed in claim 3, wherein the first air inlet is disposed on the fourth side wall and the projecting apparatus further comprises:
- a first heat sink thermally coupled to the light source module, wherein the first heat sink is disposed between the first air outlet and the first fan set;
- a second heat sink thermally coupled to the light source module, wherein the second heat sink is disposed at the first air inlet; and
- a third heat sink thermally coupled to the light source module, wherein the power supply is disposed between the third heat sink and the second fan set.

8. The projecting apparatus as claimed in claim 7, wherein the light source module further comprises:
- a first solid state light emitting device thermally coupled to the first heat sink;
- a second solid state light emitting device thermally coupled to the second heat sink; and
- a third solid state light emitting device thermally coupled to the third heat sink.

9. The projecting apparatus as claimed in claim 8, wherein the first solid state light emitting device is thermally coupled to the first heat sink via a first heat pipe, the second solid state light emitting device is thermally coupled to the second heat sink via a second heat pipe, and the third solid state light emitting device is thermally coupled to the third heat sink via a third heat pipe.

10. The projecting apparatus as claimed in claim 3, wherein the first air inlet is disposed on the fourth side wall, the chassis further comprises a second air inlet disposed on the third side wall, and the projecting apparatus further comprises:
- a first heat sink thermally coupled to the light source module, wherein the first heat sink is disposed between the first air outlet and the first fan set;
- a second heat sink thermally coupled to the light source module, wherein the second heat sink is disposed at the first air inlet; and
- a third heat sink thermally coupled to the light source module, wherein the power supply is disposed between the third heat sink and the third side wall.

11. The projecting apparatus as claimed in claim 10, wherein the light source module comprises:
- a first solid state light emitting device thermally coupled to the first heat sink;
- a second solid state light emitting device thermally coupled to the second heat sink; and
- a third solid state light emitting device thermally coupled to the third heat sink.

12. The projecting apparatus as claimed in claim 11, wherein the first solid state light emitting device is thermally coupled to the first heat sink via a first heat pipe, and the second solid state light emitting device is thermally coupled to the second heat sink via a second heat pipe.

13. The projecting apparatus as claimed in claim 2, wherein the light valve disposed within the chassis and configured to convert a light beam emitted from the light source module into an image beam, and the light valve is thermally coupled to a fourth heat sink; and the projection lens is configured to convert the image beam into a projection beam.

14. The projecting apparatus as claimed in claim 13, wherein the fourth heat sink is disposed close to the second fan set, wherein the second air flow flows through the fourth heat sink and the second fan set in sequence before flowing out of the chassis via the second air outlet.

* * * * *